United States Patent [19]

Müller et al.

[11] 4,322,250
[45] Mar. 30, 1982

[54] MASTIC ASPHALT MIXTURE

[75] Inventors: Karl-Hans Müller, Bruchköbel; Walter Barthel, Langenselbold, both of Fed. Rep. of Germany

[73] Assignee: Deutsche Gold- und Silber-Scheideanstalt vormals Roessler, Frankfurt, Fed. Rep. of Germany

[21] Appl. No.: 75,061

[22] Filed: Sep. 12, 1979

[30] Foreign Application Priority Data

Nov. 9, 1978 [DE] Fed. Rep. of Germany ....... 2848583

[51] Int. Cl.³ .............................................. C08L 95/00
[52] U.S. Cl. ................................................. 106/281 R
[58] Field of Search ............................. 106/281R, 284

[56] References Cited

U.S. PATENT DOCUMENTS

| | | | |
|---|---|---|---|
| 2,045,906 | 6/1936 | Gardner et al. | 106/281 R |
| 2,201,981 | 5/1940 | Baron | 106/281 R |
| 2,759,843 | 8/1956 | Hardman | 106/281 R |
| 3,173,800 | 3/1965 | Wilson | 106/281 R |
| 3,262,800 | 7/1966 | Baxter | 106/281 R |
| 3,766,074 | 10/1973 | Brouillette | 106/281 R |
| 3,776,748 | 12/1973 | Richards | 106/281 R |
| 3,920,470 | 11/1975 | Bertrand | 106/281 R |

Primary Examiner—Lorenzo B. Hayes
Assistant Examiner—Amelia B. Yarbrough
Attorney, Agent, or Firm—Beveridge, Degrandi and Kline

[57] ABSTRACT

Mastic asphalt mixture for road, building and industrial construction, which contains 0.1 to 2% by weight of silica. For example, a precipitated silica, a precipitated and spray dried, or a pyrogenously produced silica may be used as a synthetic silicic acid. The content of synthetic silica produces an essentially higher degree of hardness in the finished mastic asphalt layer.

3 Claims, 7 Drawing Figures

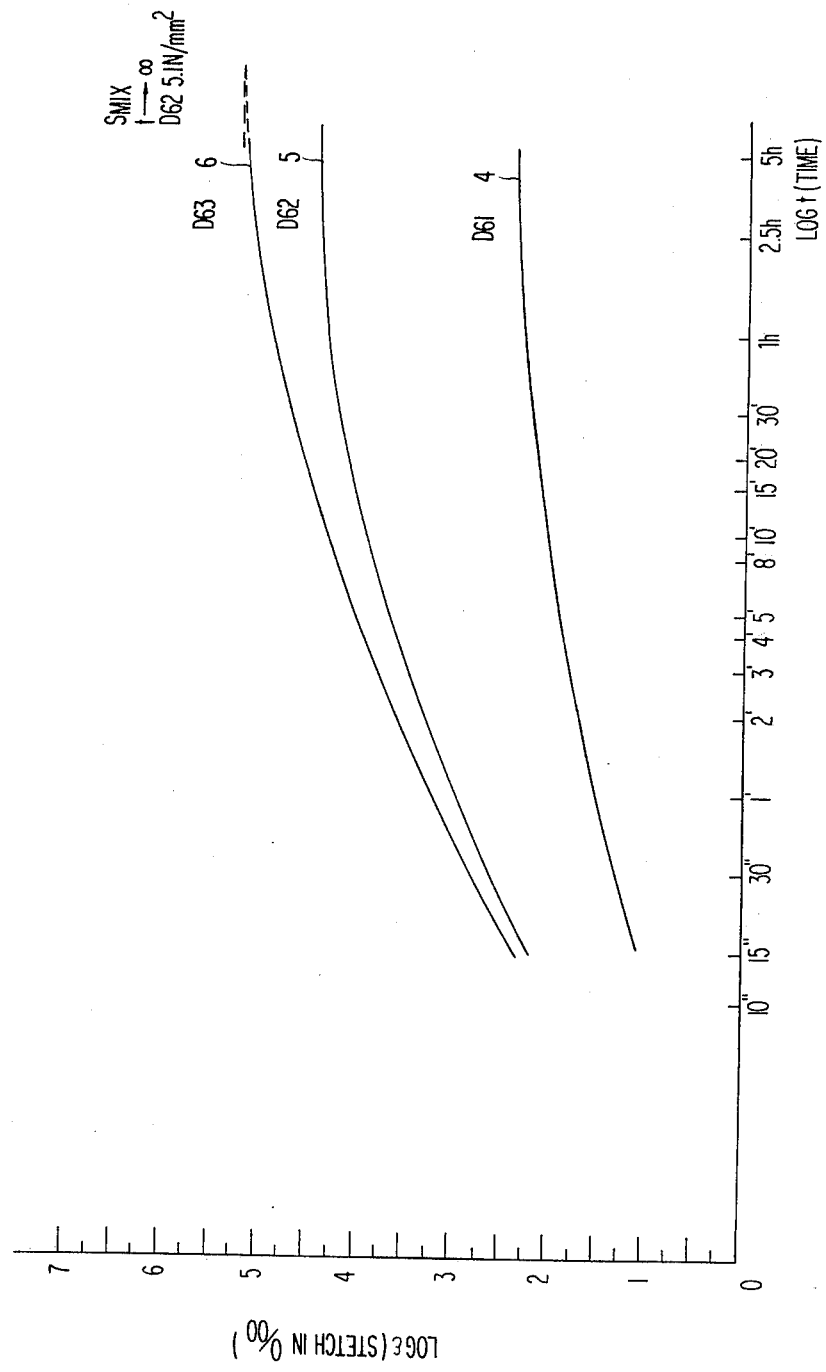

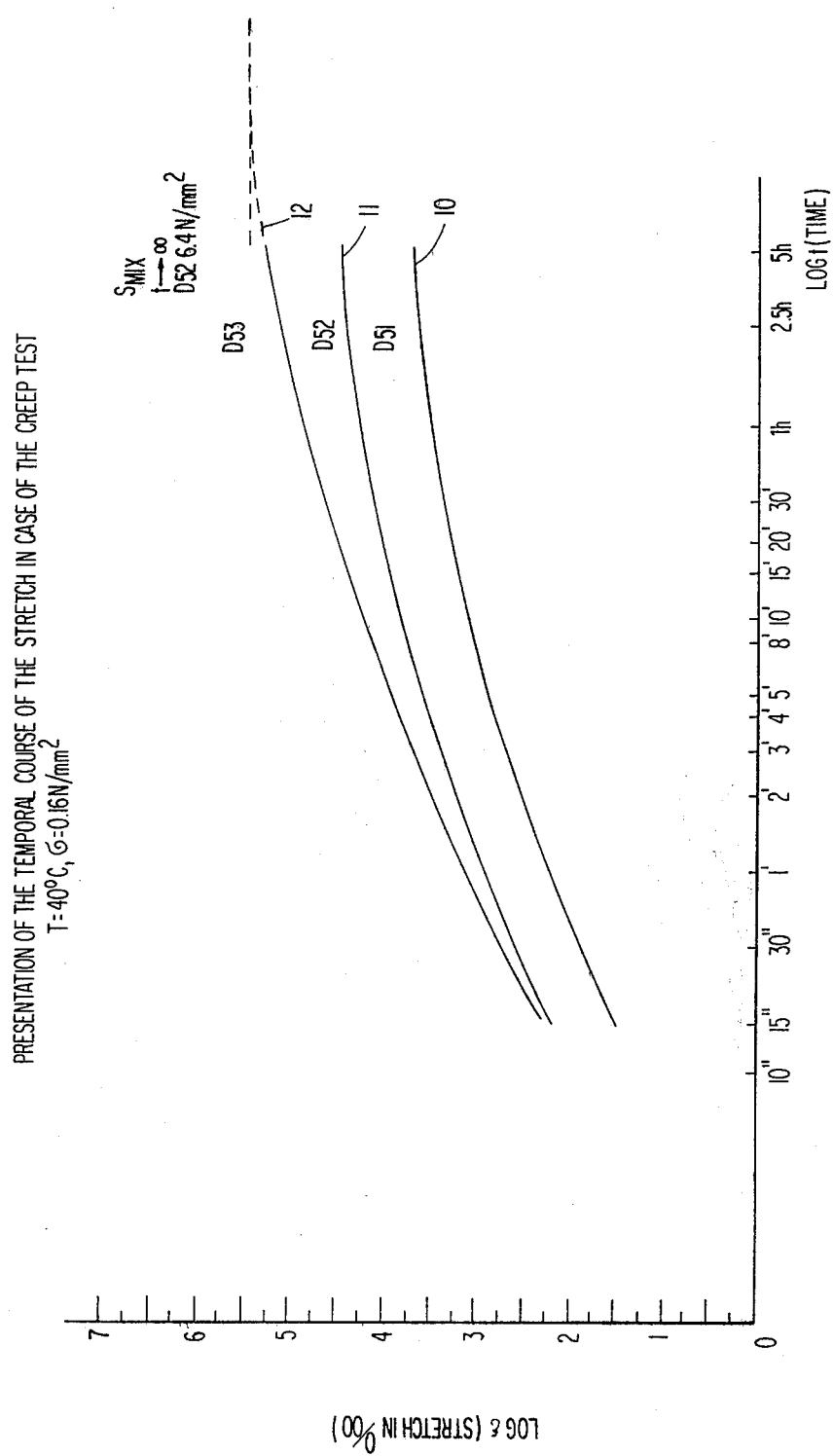

MASTIC ASPHALT MIXTURE

INTRODUCTION OF THE INVENTION

Mastic asphalt mixtures are used for example for the production of upper and topmost coverings on roads, parking places or bridges, for insulating floor finishes in building construction or in industrial construction for workshops or storage sheds.

Mastic asphalt, since it has no pockets is merely cast and not rolled. After cooling down it is brittle.

DESCRIPTION OF THE DRAWINGS

FIGS. 6 and 7 are plots of creep or stretch versus time.

SUMMARY OF THE INVENTION

Figure 1:
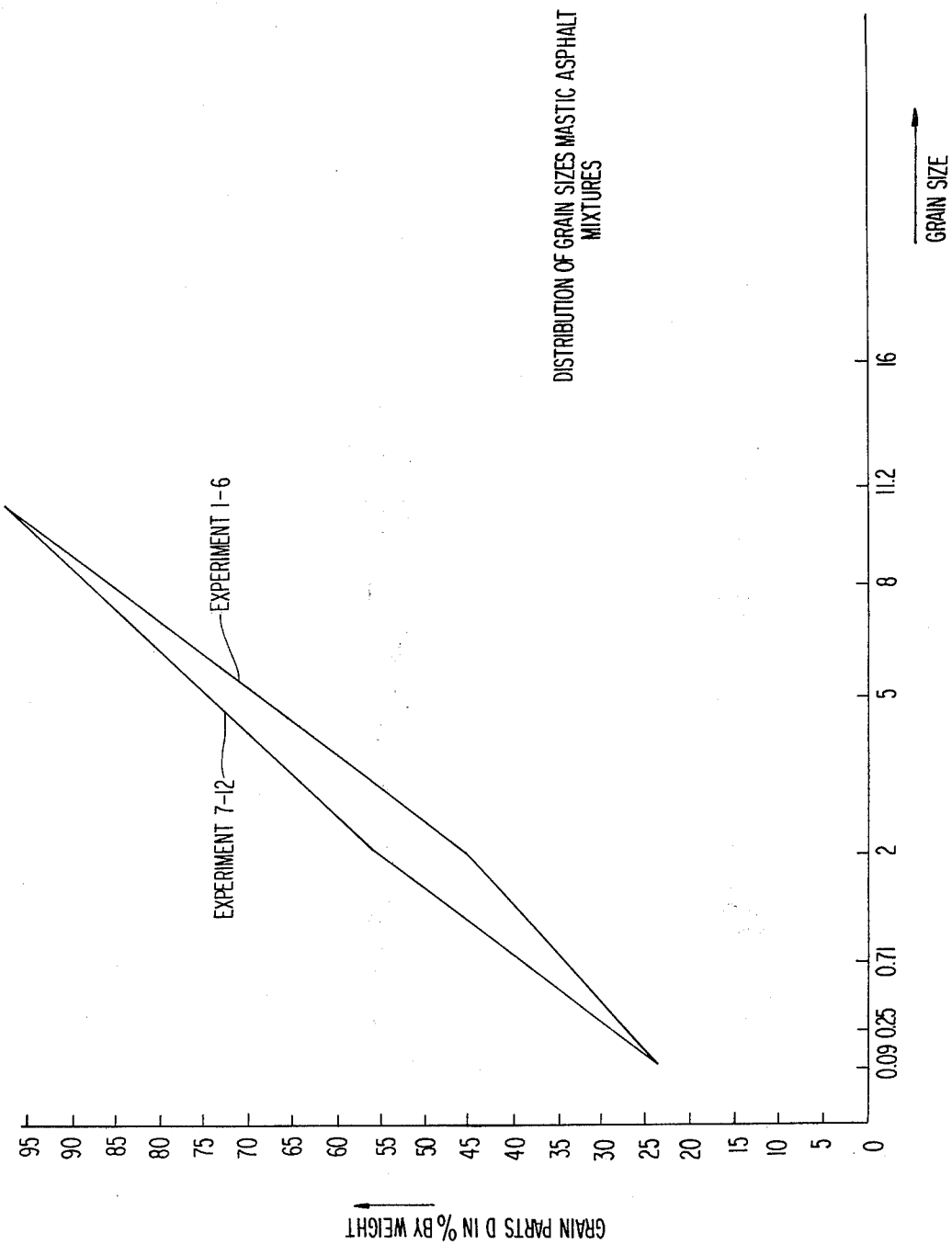
FIG. 1 is an aggregate grading curve showing distribution of grain sizes of the mastic asphalt mixture.
Figure 2:
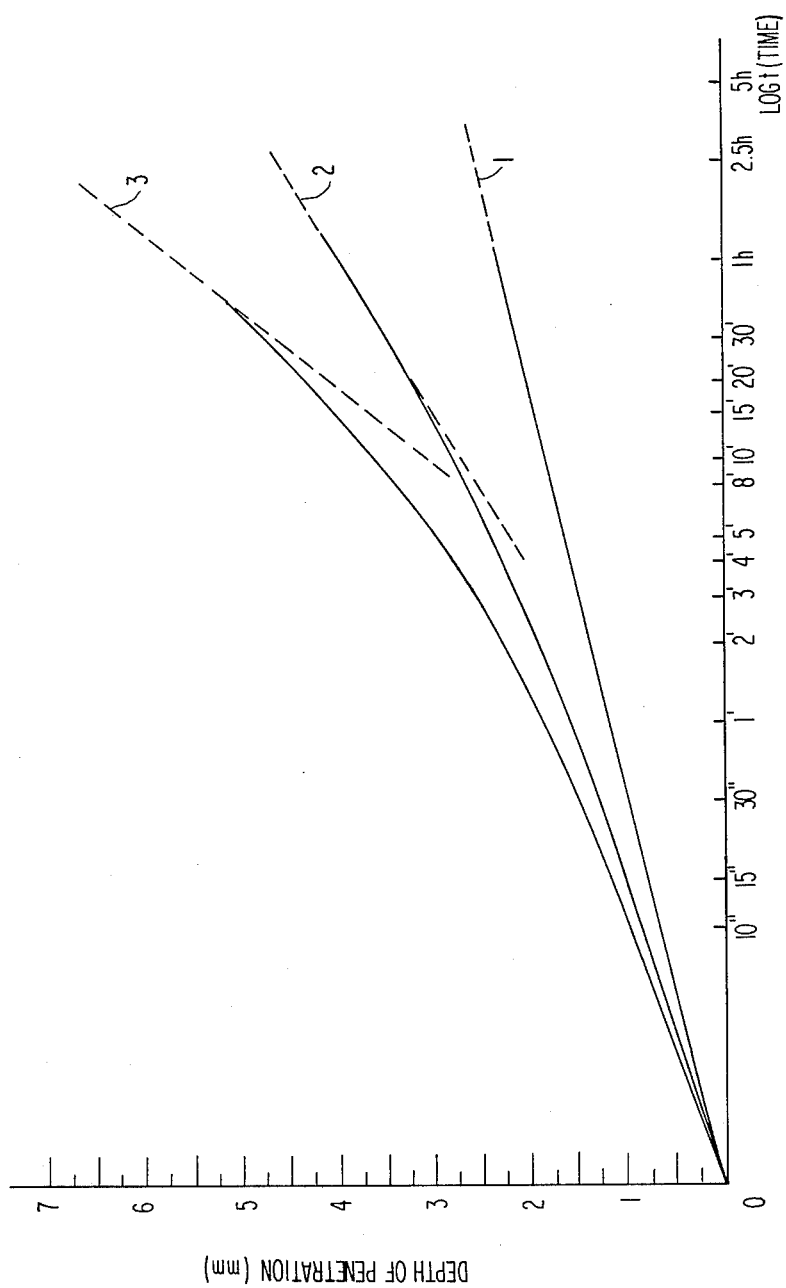
FIGS. 2, 3, 4 and 5 are plots of depth of penetration versus time for mastic asphalt mixtures of the invention.
Figure 3:
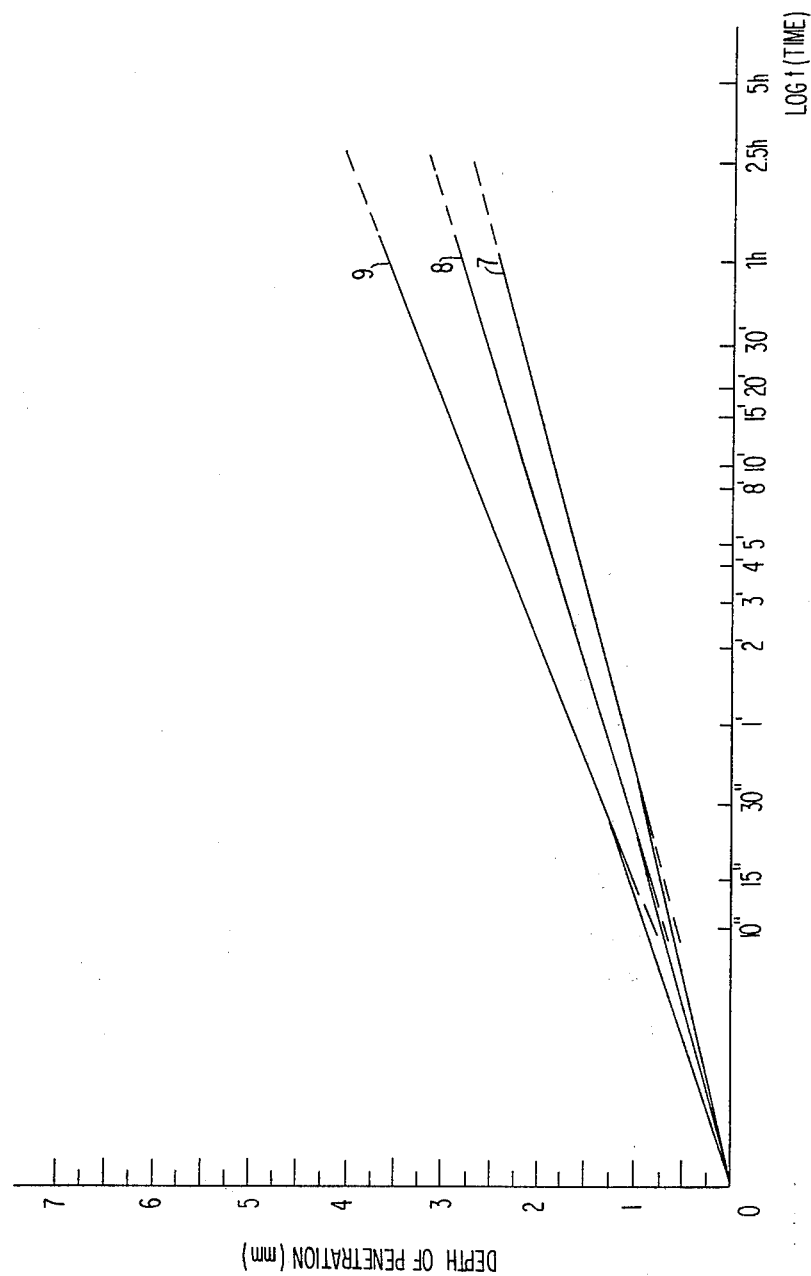
Figure 4:
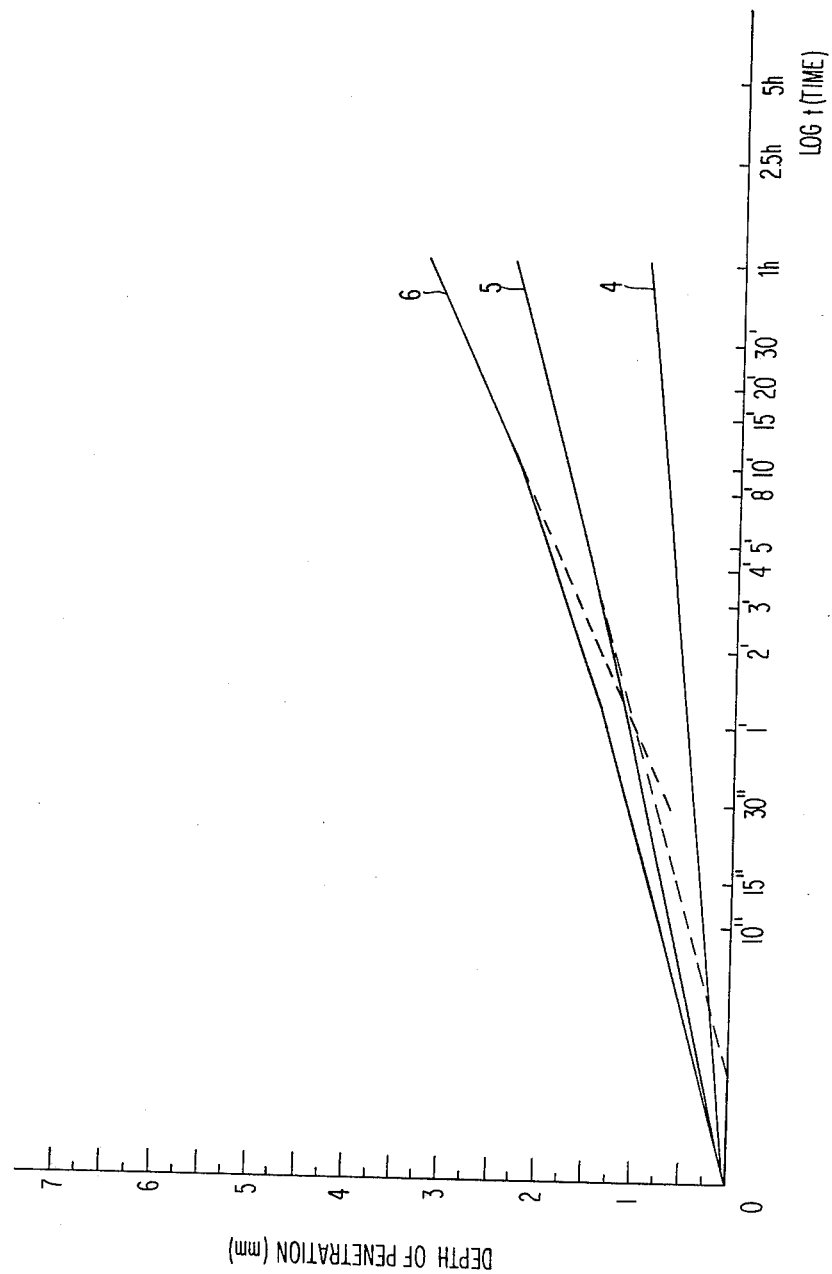
Figure 5:
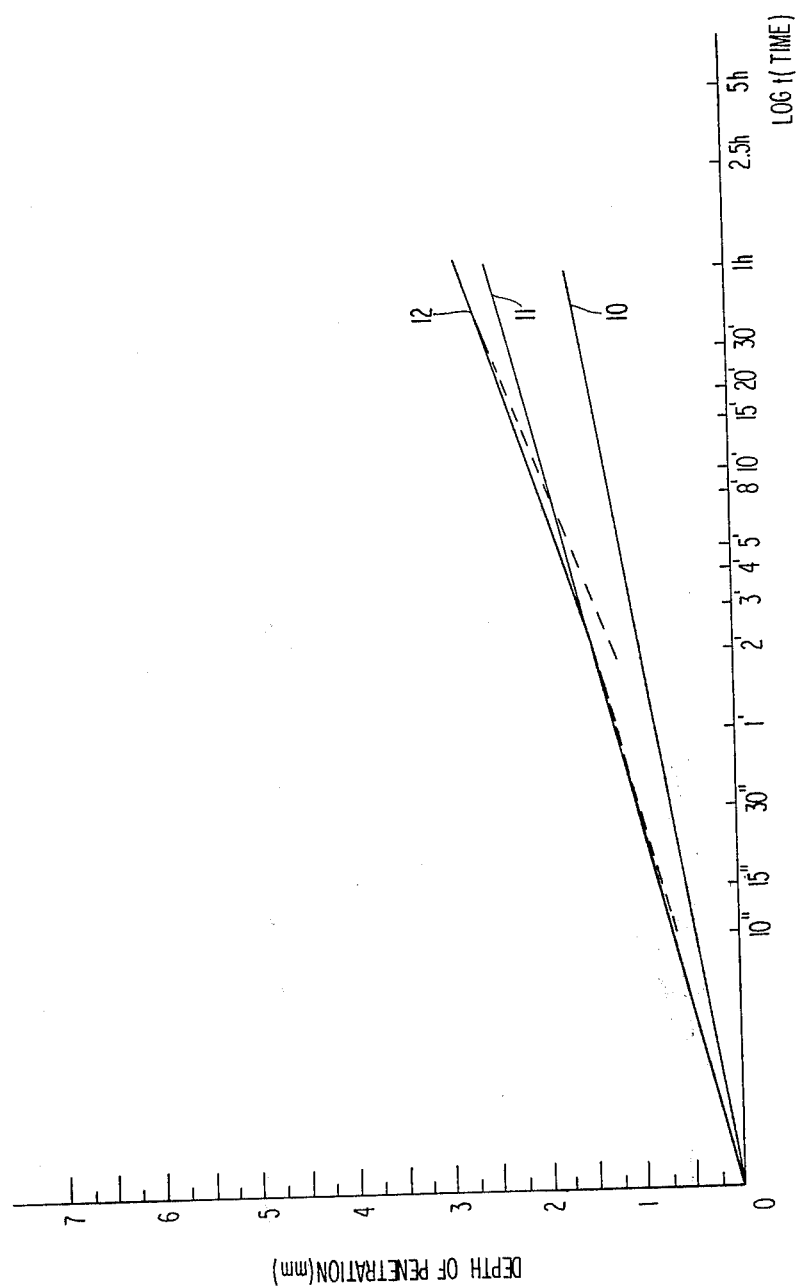

The object of the invention is a mastic asphalt mixture which is characterized in that it contains 0.1 to 2% by weight of synthetic silica.

The mastic-asphalt mixture of the invention may contain as minerals natural stone chips (such as for example, basalt, diabase, gabbronite, granite or porphyr, gravel or moraine splits with 2–16 mm granulation), crusher sand (=sand portion from the gravel or split-production of quarries) with 0.09–2 mm granulation from the above rocks, natural sand (round sand=pit or river sand) or mineral filler (flour lime or natural filler from the crushing plants with 0–0.09 mm granulation).

Bitumen, coal-tar pitch or mixtures of the two may be used as binder for the mineral mix. In the case of bitumen or bitumen-tar-mixtures, the refineries produce different designations and adjustments of types. These depend on the final hardness values, which are specified by penetration values (=depth of penetration in tenths of millimeters) or ring-ball values (=penetration of a ball into a binder with consideration of the temperature) (DIN 1996).

A precipitated silica, a precipitated and spray-dried silica or else silica acid produced pyrogenously may be used as synthetic silica.

In a preferred embodiment the mastic asphalt mixture may contain 0.1 to 1.2% by weight of synthetic silica.

The synthetic silica used may have a BET-surface of 150 to 250 m²/g.

A silica with the following physico-chemical characteristics may be used as a precipitated silica:

| | |
|---|---|
| Appearance | Loose, white powder |
| X-ray structure | Amorphous |
| Surface | 170 ± 25 m²/g (acc. to BET) |
| Average size of the primary particles | 18 millimicron |
| Specific gravity | 2.05 g/ml |
| Degree of purity | SiO$_2$[6] 98% |
| | Na$_2$O[6] 1% |
| | Al$_2$O$_3$[6] 0.2% |
| | SO$_3$[6] 0.8% |
| Loss at drying[1] | 6% |
| Loss at annealing[2] [3] | 5% |
| pH-value[4] | 6.3 |
| Solubility | Practically insoluble in water |
| Characteristic | Precipitated silica |
| Tamping density[5] | 200 g/liter |
| Screening residue according to Mocker (DIN 53 580) | 0.2% |

[1]DIN 53 198, METHOD A
[2]Related to the substance dried for two hours at 105° C. DIN 55 921
[3]DIN 52 911
[4]DIN 53 200
[5]DIN 53 194
[6]Related to the substance annealed for two hours at 1000° C.

As a precipitated silica, a silica may be used which has the same physico-chemical characteristic data and which differs merely in the level of the tamping density from the one mentioned above. The tamping density may amount, for example, to 70 g/l.

As a precipitated and spray-dried silica, a silica with the following physico-chemical characteristic data may be used:

| | | |
|---|---|---|
| Surface acc. to BET | m²/g | 190 |
| Average size of the primary particles | millimicrons | 18 |
| Average size of the secondary particles | micrometers | 80 |
| Tamping density (DIN 53 194) | g/l | 220 |
| Loss at drying (DIN 55 921) two hours at 105° C. | % | 6 |
| Loss at annealing[1] (DIN 55 921) (two hours at 1000° C.) | % | 5 |
| pH-value (DIN 53 200) | | 6.3 |
| SiO$_2$ (DIN 55 921)[3] | % | 98 |
| Al$_2$O$_3$ | % | 0.2 |
| Fe$_2$O$_3$ | % | 0.03 |
| Na$_2$O | % | 1 |
| SO$_3$ | % | 0.8 |
| Screening residue acc. to Mocker (DIN 53 580) | % | 0.5 |
| Oil number (as in Din 53 199) g/100g | | 230 |

[1]related to the substance dried for two hours at 105° C.
[2]in water: acetone or methanol 1:1
[3]related to the substance annealed for two hours at 1000° C.
[4]contains about 2% chemically bound carbon The same precipitated and spray-dried silica may also be used in a ground state with a medium size of the secondary particles of for example, 5 micro-meters.

As a pyrogenously produced silica, one may use a silica with the following physico-chemical characteristic data:

| | | |
|---|---|---|
| Primary particle size | milimicrons | 12 |
| SiO$_2$* | % | <99.8 |
| Molar weight | | 60.09 |
| Surface according to BET | m²/g | 200 ± 25 |
| Loss at drying (acc. to DIN 53 198) (two hours at 105° C.) | % | <1.5 |
| Loss at annealing (acc. to DIN 62 911) (two hours at 1000° C.) | % | <1 |
| pH-value (acc. to DIN 53 200) (in 4% aqueous dispersion) | | 3.6–4.3 |
| Grit (acc. to Mocker DIN 53 580) | % | <0.05 |
| HCl | % | <0.025 |
| Al$_2$O$_3$ | % | <0.05 |
| TiO$_2$ | % | <0.03 |
| Fe$_2$O$_3$ | % | <0.003 |
| Na$_2$O | % | <0.0009 |
| P | % | <0.0002 |
| Ni | % | <0.0002 |
| Cr | % | <0.0002 |
| Cu | % | <0.00003 |
| Pb | % | <0.00002 |
| S | % | <0.0004 |

| -continued | | |
|---|---|---|
| $B_2O_3$ | % | <0.003 |

*related to the substance annealed for two hours at 1000° C.

The mastic asphalt mixture of the invention has the advantage that the depth of penetration measured in it according to DIN 1996 is considerably less.

The sensitivity of the mastic asphalt mixture as compared to fluctuations in the binder content is greatly reduced so that dosing errors in certain fluctuations are balanced out.

Surprisingly, the mastic asphalt mixture has a higher hardness and a better continuous stability, although because of the addition of a quantity of synthetic silica a greater quantity of binder is required.

DETAILED DESCRIPTION OF THE INVENTION

The mastic asphalt mixture of the invention will be explained and described in more detail on the basis of the following examples:

The distribution of grain sizes of the mastic asphalt mixtures follows the aggregate grading curve according to FIG. 1. For the evaluation of the basic suitability it seems effective to weigh the mixtures in, by way of preparation. For this purpose, the limestone meal in the commercial granulation, the additions of natural sand and chips are always weighed-in, however by way of preparation in the individual test-grain-classes. The mineral substances as well as the synthetic silica are then mixed thoroughly with the use of a laboratory mixer of the type Rego SM2. After a mixing time of 5-10 minutes, the synthetic silica will then be mixed evenly, first with the filler and then with the sand and chip components. The bitumen in the form of road construction asphalt B 45 is charged cold into the tempered mineral substances, and retempered in the warming cabinet. Subsequently, the bituminous mixture is produced in the Regomixer. Using a high r.p.m. in the mixer a homogeneous, bituminous mass develops within 5-6 minutes of mixing time. Following that, the mastic asphalt mixture, with exclusion of air and tempering, is exposed to a re-mixing time at a very low r.p.m., in order to homogenize the mastic asphalt mixture even further.

The mastic asphalt mixtures, in a quantity for the production of 5 mastic asphalt cubes, are then discharged from the mixing pot and are spread out on a metal-covered slab. The quantities for the production of 5 mastic asphalt cubes are then taken from the flatly spread-out mastic asphalt cake.

The compositions of the individual mastic asphalt mixtures may be gathered from Table I.

The depth of penetration is measured according to DIN 1996. The values found are likewise listed in Table I and correspond to FIGS. 2, 3, 4 and 5.

A precipitated and spray-dried silica with the following physicochemical characteristic data is used (Sipernat 22$^R$) as synthetic silica:

| Surface according to BET | $m^2/g$ | 190 |
|---|---|---|
| Average size of the primary particles | milimicrons | 18 |
| Average size of the secondary particles | micrometers | 80 |
| Tamping density (DIN 53 194) | g/l | 220 |
| Loss at drying (DIN 55 291) (two hours at 105° C.) | % | 6 |
| Loss at annealing[1] (DIN 55 291) (two hours at 1000° C.) | % | 5 |
| pH value (DIN 53 200) | | 6.3 |
| $SiO_2$ (DIN 55 921)[3] | % | 98 |
| $Al_2O_3$ | % | 0.2 |
| $Fe_2O_3$ | % | 0.03 |
| $Na_2O$ | % | 1 |
| $SO_3$ | % | 0.8 |
| Screening residue as in Mocker (DIN 53 580) | % | 0.5 |
| Oil number (as in DIN 53 199) | g/100g | 230 |

[1]related to the substance dried for two hours at 105° C.
[2]in water: acetone or methanol 1:1
[3]related to the substance dried for two hours at 1000° C.
[4]contains about 2% chemically bound carbon

TABLE I

| Mixtures | | 1 | 2 | 3 | 4 | 5 | 6 |
|---|---|---|---|---|---|---|---|
| Binder B 45 | (% in weight) | 6.5 | 7.0 | 7.5 | 6.8 | 7.3 | 7.8 |
| Filler | (% in weight) | 22.8 | 22.8 | 22.8 | 22.8(23.2) | 22.8(23.2) | 22.8(23.2) |
| Chips | (% in weight) | 45.0 | 45.0 | 45.0 | 45.0 | 45.0 | 45.0 |
| SIPERNAT 22 | (% in weight) | 0 | 0 | 0 | 0.4 | 0.4 | 0.4 |
| Depth of penetration | (mµ) | | | | | | |
| after 30 minutes | | 2.1 | 3.5 | 4.6 | 0.9 | 2.2 | 2.9 |
| after 60 minutes | | 2.3 | 4.0 | 4.6 | 1.0 | 2.4 | 3.3 |
| difference Δ ET | | 0.2 | 0.5 | 1.0 | 0.1 | 0.2 | 0.4 |
| Volumetric density | (g/cm$^3$) | 2.418 | 2.411 | 2.401 | 2.331 | 2.408 | 2.394 |

| Mixture | | 7 | 8 | 9 | 10 | 11 | 12 |
|---|---|---|---|---|---|---|---|
| Binder B 45 | (% in weight) | 6.5 | 7.0 | 7.5 | 6.5 | 7.0 | 7.5 |
| Filler | (% in weight) | 22.8 | 22.8 | 22.8 | 22.8(23.2) | 22.8(23.2) | 22.8(23.2) |
| Chips | (% in weight) | 55.0 | 55.0 | 55.0 | 55.0 | 55.0 | 55.0 |
| SIPERNAT 22 | (% in weight) | 0 | 0 | 0 | 0.4 | 0.4 | 0.4 |
| Depth of penetration | (mµ) | | | | | | |
| after 30 minutes | | 2.1 | 2.6 | 3.3 | 1.5 | 2.3 | 2.5 |
| after 60 minutes | | 2.3 | 2.8 | 3.6 | 1.7 | 2.5 | 2.8 |
| difference Δ ET | | 0.2 | 0.2 | 0.3 | 0.2 | 0.2 | 0.3 |
| Volumetric density | (g/cm$^3$) | 2.458 | 2.447 | 2.439 | 2.412 | 2.426 | 2.423 |

In the above Table, the difference between the sum of the listed ingredients and 100% is constituted by sand. Thus the balance may be any one or mixture of natural sands (round sand = pit or river sand) linestone, diabase, gabbronite, phosphyr, and the like). Also in the above Table, the value in parenthesis for the amount of filler includes the quantity of SIPERNAT 22.

EVALUATION OF THE RESULTS OF THE EXAMPLES

There is an additional requirement of binder of about 0.0 to 0.8% by weight for the mixture of mastic asphalt with 45.0% by weight of chips whenever using 0.4% by weight of SIPERNAT 22 (cf. examples 4, 5 and 6). As a result of the additions of synthetic silica amounting to 0.4% by weight, one is able to decrease the sensitivity of the mixtures with respect to fluctuations of the binder content. This reduced sensitivity means an important advantage in building construction, since it leads from production charge to production charge, to a more uniform mastic asphalt, than has been known hitherto. Insofar, it will be advantageous to add small quantities of synthetic silica SIPERNAT 22 R of 0.4% by weight, to mixtures of a mastic asphalt with 45% by weight of chips, despite the higher requirement of binder connected therewith.

In the mixtures according to examples 10, 11 and 12 with an increased chips-content of 55.0% by weight, in case of the addition of 0.4% by weight of SIPERNAT 22, the additional requirement of binder is about 0.3% by weight lower. Here too, there appears a lower sensitivity of the mixtures with respect to fluctuations of the binder content.

The lower deformability of the mastic asphalt mixture of the invention is shown in FIGS. 6 and 7 in which the results of the creep test are represented graphically. The creep test is based on the publication by Hill "The Creep of Asphalt Mixes" Journal of the Institute of Petroleum, Volume 59, No. 570, November 1973.

We claim:

1. A composition consisting essentially of mastic asphalt, a finely divided mineral filler, and a sufficient amount of a synthetic silica to produce an increased hardness in said composition as compared to an asphalt not containing said silica, said silica has a BET surface area of 150 to 250 $m^2/g$.

2. The composition as defined in claim 1 wherein said silica is present in the amount of from 0.5 to 2% by weight of said mixture.

3. The composition as defined in claim 1 or 2 wherein the silica is selected from the group consisting of precipitated silica and pyrogenic silica.

* * * * *